(12) United States Patent
Cottone et al.

(10) Patent No.: US 8,244,400 B2
(45) Date of Patent: Aug. 14, 2012

(54) METHOD AND DEVICE FOR AUTOMATICALLY STACKING TIRES ON A SUPPORT

(75) Inventors: Norbert Cottone, Zusmarshausen (DE); Daniel Kotzor, Seefield (DE); Torsten Albrecht, Uttenreuth (DE); Martin Peghini, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 832 days.

(21) Appl. No.: 12/084,536

(22) PCT Filed: Nov. 7, 2006

(86) PCT No.: PCT/DE2006/001950
§ 371 (c)(1),
(2), (4) Date: Mar. 5, 2009

(87) PCT Pub. No.: WO2007/054072
PCT Pub. Date: May 18, 2007

(65) Prior Publication Data
US 2009/0306812 A1    Dec. 10, 2009

(30) Foreign Application Priority Data
Nov. 8, 2005   (DE) .......................... 10 2005 053 296

(51) Int. Cl.
*B65G 57/20* (2006.01)
(52) U.S. Cl. ........................... 700/217; 414/788; 211/24
(58) Field of Classification Search .................. 700/213, 700/217, 228, 230
See application file for complete search history.

(56) References Cited

U.S. PATENT DOCUMENTS

RE33,416 E  *  10/1990  Konishi et al. ................ 700/217
5,249,131 A  *   9/1993  Kato ............................. 700/217
(Continued)

FOREIGN PATENT DOCUMENTS

DE         6 89 13 516.4        2/1990
(Continued)

*Primary Examiner* — Gene Crawford
*Assistant Examiner* — Kyle Logan
(74) *Attorney, Agent, or Firm* — Wood, Herron & Evans, LLP

(57) ABSTRACT

The present invention relates to a method and a device for automatically stacking tires (4) on a support (1). According to the method, geometrical data of the tires (4) and/or a digital model of the tires (4) is provided, based on the geometrical data and/or the tire model and a predefinable size of the support (1), an algorithm calculates a stacking pattern for the tires (4) on the support (1) by taking into account a predefined size of the support, said stacking pattern making it possible to store the largest possible number of tires (4) in a stable manner on the support (1). Positional data of the tires (4) are adopted from the stacking pattern and associated trajectories of a handling device for stacking the tires (4) are generated and stored according to the stacking pattern. The stored positional data and trajectories are retrieved and transferred to the handling device, which receives the tires (4) at a given receiving position and puts the same on the support (1) in accordance with the positional data and associated trajectories. The present method and the associated device make it possible to automatically stack the tires with an optimal stacking pattern for the tires.

32 Claims, 5 Drawing Sheets

U.S. PATENT DOCUMENTS

| | | | |
|---|---|---|---|
| 5,697,294 A * | 12/1997 | Keller et al. | 100/100 |
| 6,055,462 A * | 4/2000 | Sato | 700/217 |
| 6,273,670 B1 * | 8/2001 | Henson et al. | 414/796.9 |
| 6,654,666 B1 * | 11/2003 | Terada | 700/262 |
| 6,721,762 B1 * | 4/2004 | Levine et al. | 1/1 |
| 7,061,508 B1 * | 6/2006 | Noguchi et al. | 345/619 |
| 7,369,976 B1 * | 5/2008 | Nakajima | 703/6 |
| 7,699,087 B2 * | 4/2010 | Rogalla et al. | 157/1.1 |
| 2001/0028838 A1 * | 10/2001 | Leimbach et al. | 414/788 |
| 2004/0006408 A1 * | 1/2004 | Kakutani et al. | 700/213 |
| 2004/0044504 A1 * | 3/2004 | Shimizu | 703/2 |
| 2004/0068391 A1 * | 4/2004 | Futamura et al. | 702/183 |
| 2004/0165980 A1 * | 8/2004 | Huang et al. | 414/799 |
| 2006/0106487 A1 * | 5/2006 | Allen et al. | 700/213 |

FOREIGN PATENT DOCUMENTS

| | | |
|---|---|---|
| EP | 1 059 148 | 11/2004 |
| GB | 1 457 473 | 12/1976 |
| GB | 2 126 153 A | 3/1984 |
| WO | WO 00/26128 | 5/2000 |
| WO | WO 2005/100213 A1 | 10/2005 |

* cited by examiner

METHOD AND DEVICE FOR AUTOMATICALLY STACKING TIRES ON A SUPPORT

TECHNICAL AREA OF APPLICATION

The present invention relates to a method and a device for automatically stacking tires on a support, in particular for stacking tires according to a rick-rack pattern or a vertical pattern in pallets.

Tires are generally stored on pallets in which the tires are stacked in manner which is as space-saving as possible. The rick-rack pattern and the vertical pattern have proved successful as stacking patterns in this case. In the rick-rack pattern the tires are stacked in such a manner that they are nested in one another. A very dense stacking pattern is hereby achieved. In the vertical pattern, the tires stand on their treads tightly against one another in the pallets. In order to achieve the desired stability, two parallel rods on which the tires stand are inserted for each row of tires.

PRIOR ART

The stacking of tires into the pallets has hitherto been performed by hand. In order to accommodate as many tires as possible in the dispatch warehouse, these must be stacked as space-savingly as possible in the pallets provided for this purpose. The optimal stacking pattern for different tire sizes is previously tested manually in each case.

For a space-saving stacking of tires on a tire pallet, it is known for example from DE 89 13 516 U1 to stack the tires in a vertical stacking pattern. In this stacking pattern the tires stand next to one another on their treads, i.e. vertically. The document is particularly concerned with the design of a tire pallet which allows the tires to be stacked vertically.

Another possible for the space-saving stacking of tires is provided by the rick-rack stacking pattern as is known, for example, from AT 358 993. The structure of this stacking pattern is described in detail in this document.

So far, automated solutions have merely been provided for short-term intermediate storage of tires. In this case, multi-axial portal systems or robots with appropriate gripping tools set down the tires according to simple patterns. These comprise horizontal patterns in which the tires are stacked horizontally on their lateral surfaces. Such a method is known from WO 00/26128 A1. In this method, incoming tires are sorted according to tire size and stacked horizontally on the base. The individual stacks are then loaded for further transport on pallets and are moved away by means of a conveyor belt. In this case, online tire data of the supplied tires are recorded and the instantaneously best storage locations are calculated by means of a computer program. In this case, the computer program decides in each case depending on several parameters the position in which the respective tire will be placed and in particular, whether this tire will be placed on an already existing stack or whether this tire will begin a new stack. The parameters comprise, inter alia, the tire data, the instantaneous working load of each robot module involved and the overall capacity of each robot module. The stacking and sorting process is carried out until a sufficient number of stacks is achieved to thereby load a pallet. The stacks are then received as a whole by means of the gripping tool designed for this purpose and loaded onto the pallet. In this case, the computer program is designed for an optimal throughput when loading the tires. The relevant gripping tool is designed so that both individual tires and also complete stacks of tires can be gripped.

However, the method of WO 00/26128 A1 is not suitable for automated palleting of tires which is as space-saving as possible, for which primarily the rick-rack pattern or the vertical pattern come into consideration.

Other gripping tools for receiving and for putting down tires are known, for example, from EP 1059148 B1, U.S. Pat. No. 5,082,519 A or GB 2126153 A. In EP 1059148 the tires are gripped by the inner radius by pressing rotationally symmetric elements against the bead and thus holding the tire. At least two of these elements are designed to be movable in the radial direction of the tire. U.S. Pat. No. 5,082,519 A describes a gripping tool which is based on the principle of a parallel gripper comprising two gripping jaws which are movable with respect to one another, which grip carcasses of tires on the outside diameter. The tire carcasses are repositioned within the production process by means of this gripping tool. Finally, GB 2126153 A describes a gripping tool for green tires which are gripped on the inner bead by means of three movable clamping chucks.

However, none of said documents discloses a method or a device which is suitable for an automatic palleting of tires for space-saving storage. For health and economic reasons, however the manual stacking carried out hitherto is not desirable.

The object of the present invention is therefore to provide a method and a device with which tires can be placed automatically and in a space-saving manner on a support.

DESCRIPTION OF THE INVENTION

The object is achieved with the method and the device according to claims 1 and 21. Advantageous embodiments of the method and the device are the subject matter of the dependent claims or can be inferred from the following description as well as the exemplary embodiments.

In the present method for automated stacking of tires on a support, geometrical data of the tires and/or a digital model of the tires are first prepared or generated. These geometrical data comprise data such as outside diameter, inside diameter, and tire width as well as possibly the rim width. A digital model of the tires can also be prepared or generated automatically from the geometrical data. Conversely, the geometrical data can also be deduced automatically from a digital tire model. On the basis of the geometrical data and/or the tire model and a predefinable size of the support, usually a pallet, a program or algorithm calculates a rick-rack pattern and/or a vertical pattern as a stacking pattern for the tires on the support which makes it possible to achieve stable storage of the largest possible number of tires on the support. In a particular embodiment, the user can predefine the type of stacking pattern or select from the predefined selection.

Following the offline calculation of the stacking pattern for tires of the supplied geometrical data or the provided tire model, the positional data of the tires are adopted from the stacking pattern and associated trajectories of a handling device for stacking the tires are generated and stored according to the stacking pattern. Positional data are to be understood here as data of the location and the orientation of the tires. The stacking patterns are already calculated in advance for a plurality of different tire sizes or tire types which are to be stacked subsequently. In this case, for each type of tire, the corresponding positional data and trajectories together with identification information of the tire type are stored in a database. When stacking the tires, the stored positional data and the associated trajectories are then retrieved and transferred to the handling device, which receives the tires at a given receiving position and puts the same on the support in accordance with the positional data and associated trajectories. When using a database with a plurality of tire types, the tires to be stacked are initially identified and the positional data and trajectories assigned to these tires are then retrieved by reference to the stored identification information.

The same positional data and associated trajectories can be used again at a subsequent time point for automatically unloading the support or the pallet. For this purpose, the sequence and trajectories obtained from these data merely need to be reversed.

With the present method and the associated device, an optimal stacking pattern for the respective tires is therefore generated in a convenient manner with the aid of a computer and is implemented with the aid of a handling device, in particular a robot. In this case, expensive testing of stacking patterns is no longer necessary. Rather, the algorithm used automatically determines the optimal stacking pattern for the respective tires with which the largest number of tires per volume can be stored in a stable manner. In this case, the algorithm automatically takes into account the properties of the gripping tool of the handling device to allow automatic stacking of the tires with this stacking device. This robot-assisted palleting eliminates the physically hard and monotonous work of stacking so that the health of the workers is protected and costs are also saved. In addition, the automation ensures a uniform quality and application.

When calculating the stacking pattern and generating the trajectories, a collision check is also carried out on the basis of the digital tire model so that the subsequent automatic stacking can be carried out without collisions and therefore without further interventions or corrections. In particular, the so-called teaching of the placement coordinates is omitted, thus saving considerable time. This is a major advantage for the storage of new types of tires. Whereas during teaching the (estimated) placement positions must be approached manually, in the present method the placement positions can be calculated exactly and automatically adopted from the calculated stacking pattern. This automatic calculation of the positions can additionally lead to better stacking results, both with regard to the number of tires per pallet and with regard to the quality of the stacking. Since relatively uniform patterns are produced by the algorithm, loadings particularly of the lower rows of tires are distributed better, thus minimizing deformations of the tires in the stack.

In an embodiment of the present method, a CAD tire model is provided as a digital tire model for the algorithm whereby a high reliability of the method is achieved. If no CAD models are available, instead of manual creation, a suitable measurement method can be used, the data from which automatically generate the CAD data. An example of such a measurement method is an optical measurement using a laser scanner. This measurement of a tire saves time and avoids errors which can occur when inputting data manually or generating the CAD model. This therefore also guarantees a high degree of quality.

When calculating the stacking pattern, the algorithm used varies predefined or predefinable parameters of the stacking pattern within certain limits (search ranges). The parameters for the calculation of the stacking pattern can be predefined by the user. This particularly applies to the search ranges within which the algorithm searches for the optimum stacking pattern. Naturally, specific search ranges can also be fixedly set. Furthermore, it is also advantageous to provide fixed sets of parameters with relevant search ranges for different types of tires, for example, summer tires and winter tires, on the basis whereof the algorithm calculates the optimum stacking pattern.

When calculating a rick-rack parameter, primarily the placement angle of the tires and an angle designated hereinafter as the rhombus angle are parameters to be varied. The placement angle comprises the angle between the horizontal and the principal plane of the tires. The rhombus angle (cf. FIG. 4) gives the angle between the horizontal and the planes spanned by the midpoints of the tires. These planes form a diamond-shaped pattern in vertical section.

When calculating an optimal rick-rack pattern, the algorithm varies the parameters with the aim of determining the pattern with the minimal diamond area or the maximum number of tires.

The maximum penetration of the individual tires into one another can also be varied as another parameter. These parameters are naturally not a conclusive listing. Rather, other parameters can be varied in the search for the optimal stacking pattern if required.

The arrangement of the rods used for guidance or placement of the stacked tires in the individual rows of tires is an important parameter for calculating the vertical pattern. In this case, for example, the distance of the rods from the boundaries of the support, in particular from the bottom surface and the side parts, the mutual spacing of the rods or the number of layers of rods disposed one above the other can be varied as parameters or calculated automatically by the algorithm.

Different gripping tools are provided for the handling device, these tools being held in the handling device depending on the stacking pattern to be produced. In one embodiment, these comprise at least one gripping tool for stacking the tires according to a rick-rack pattern and at least one gripping tool for stacking according to a vertical pattern.

In an embodiment of the present method, for a rick-rack pattern, a first gripping tool is used for gripping the tires at the inner radius, said gripping tool comprising at least two fixed retaining elements and a movable retaining element which can be moved by means of a drive on a base plate. A flanged plate for coupling to the handling device is attached to the base plate at an angle greater than 0° and smaller than 90°. The attachment of the flanged plate can be configured as being adjustable in angle.

The gripping tool for stacking the tires according to the vertical pattern is configured so that it grips the tires at the outer radius, i.e. on the tread and additionally comprises grippers for receiving the rods for the vertical stacking. In this way, the gripping tool need not be changed during stacking of the tires in order to suitably attach the rods. The gripping tool, in this embodiment, comprises a fixed angled gripping jaw for centering the tire and a moveable gripping jaw located opposite thereto on a base plate. The movable gripping jaw can be displaced linearly by means of a drive so that the tires can be received non-positively with the gripping jaws. A flanged plate for coupling the handling device may be attached off-center on the base plate so that the tires can be placed on lateral parts of the support without the arm of the handling device colliding with the lateral parts.

During stacking of the vertical stacking pattern, the support may be inclined in such a manner that the already stacked tires do not tip. This can also be achieved automatically with a suitable tilting device which is disposed next to or below the support.

The device for carrying out the present method comprises at least one handling device, one or a plurality of gripping tools which can be received by the handling device for the tires, a data processing unit and a transfer device. The data processing unit comprises at least one calculation module that, on the basis of geometrical data of the tires and/or a digital model of the tire and a predefined size of the support, calculates a rick-rack pattern and/or a vertical pattern in which the tires stand next to one another on their treads, as a stacking pattern for the tires that makes it possible to store the largest possible number of tires on the support in a stable manner. The calculation module adopts positional data of the tires from the stacking pattern, generates associated trajectories of the handling device for the stacking of the tires according to the stacking pattern and stores the positional data and trajectories as control data. The transfer unit retrieves the control data for stacking the tires from the data processing unit or a storage medium with the control data as required and transfers the data to the controller of the handling device, which triggers the handling device according to the positional data and associated trajectories for receiving the tires at a predefined receiving position and putting the tires on the support. A robot having at least four axes for the rick-rack stacking pattern or at least five axes for the vertical stacking pattern, a vertical jointed-arm robot with six degrees of freedom is used as the handling device in this case.

The data processing device comprises a suitable user interface via which a user can input parameters for calculating the stacking pattern. Furthermore, the data processing unit is configured in such a manner that it displays a calculated stacking pattern to the user who can accept or decline this. The corresponding control data are generated from the stacking pattern and stored only when there is a confirmatory acceptance of the stacking pattern.

In one embodiment of the device for generating different types of stacking patterns, the transfer unit is configured in such a manner that it transfers data to the controller of the handling device depending on the stacking pattern to be generated, by which means the handling device receives the gripping tool provided for this stacking pattern. The embodiment of the gripping tool for which protection is claimed independently of the device, has already been explained in connection with the description of the method.

BRIEF DESCRIPTION OF THE DRAWINGS

The present method and the relevant device are explained in detail again hereinafter by reference to exemplary embodiments in connection with the drawings without restricting the scope of protection specified by the patent claims. In this case, in the figures:

WAYS FOR IMPLEMENTING THE INVENTION

Figure 3:
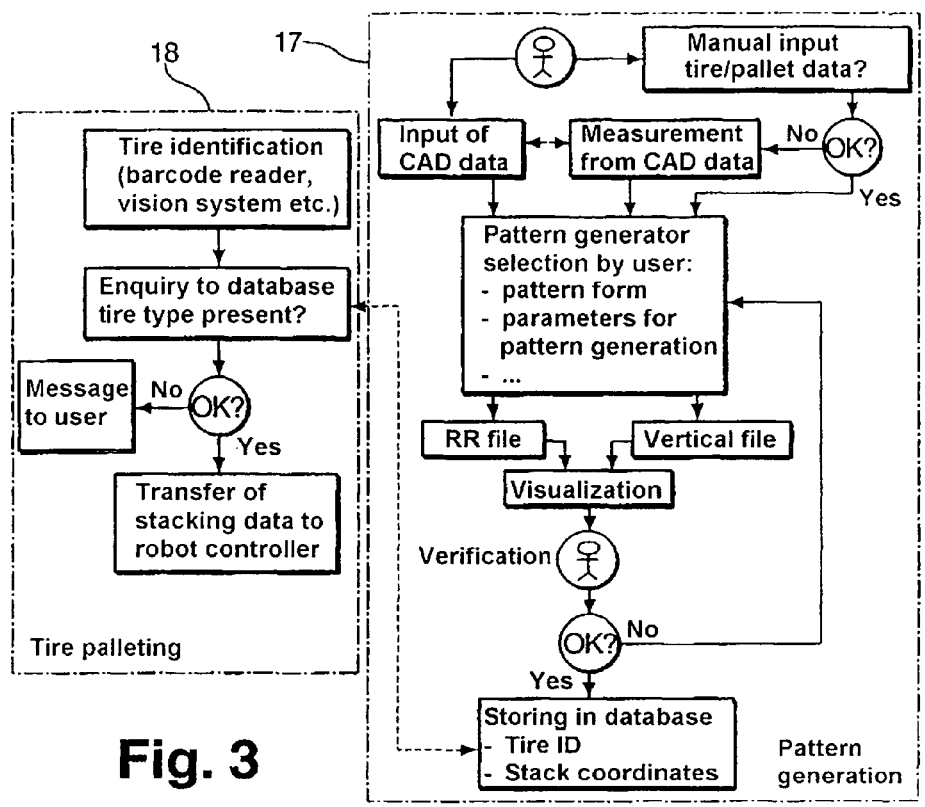
FIG. 3 shows an example of the process sequence of the present method in schematic view.

In the following exemplary embodiment, the method and the device are used for stacking tires according to the rick-rack stacking pattern and the vertical stacking pattern in a pallet. FIG. 3 shows an example of the process sequence in schematic view in which the data processing unit 17 and the transfer unit 18 of the present device are also indicated.

In this case, the user initially predefines specific data of the tires and the pallet for generating the stacking pattern. A CAD model of the corresponding type of tire is also read in. Such a digital tire model is necessary if the algorithm used determines the setting places for the tires using collision detection. In this case, the stacking pattern is generated under the boundary condition that during stacking no collisions occur between the tires or the gripping tool and other tires or lateral parts of the pallet.

The tire and pallet data can be input by direct input of the parameters in the data processing unit 17. An automatic measurement of the CAD model to determine these data is also possible.

If the data are input manually, at least the outside diameter, the inside diameter, the tire width and the rim width are required as tire parameters in the present example.

If the CAD data are read in, the software used can independently measure the tire or the pallet by an iterative method and determine the required data in this way. In addition, a CAD model of the correspondingly used gripping tool can be input in order to impart to the user a realistic impression of the tire and gripper movement during placement during a subsequent visualization of the calculated stacking pattern. This process can be displayed to the user as an animated representation.

Figure 1:
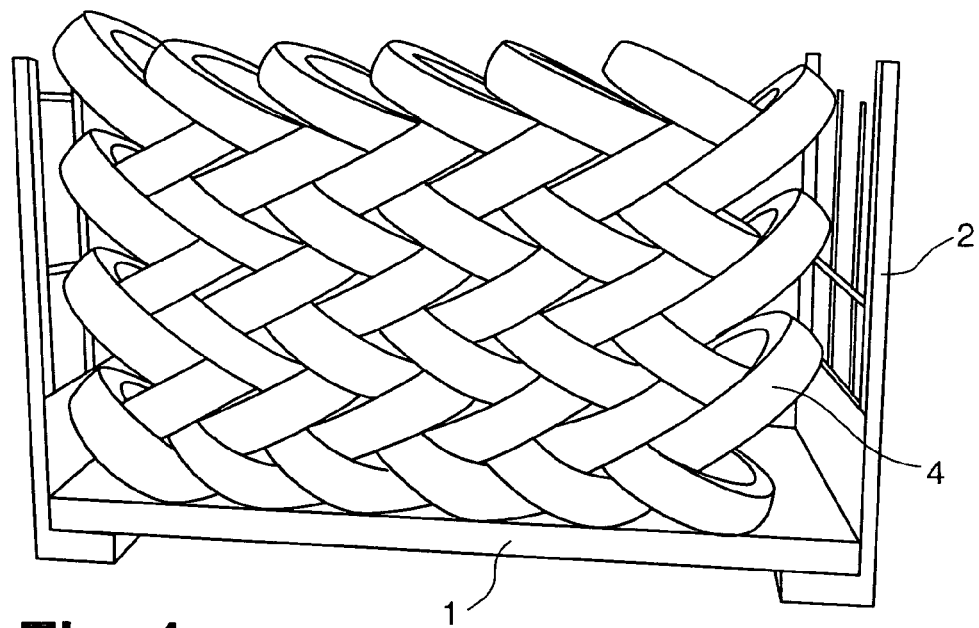
FIG. 1 shows an example of a rick-rack stacking pattern.

The type of pattern to be produced can be predefined or selected by the user. A corresponding input facility is provided for this purpose. Depending on the selected pattern, further inputs can then also be made by the user which are described in detail in the following paragraphs. FIG. 1 shows an example of a rick-rack pattern such as can be produced with the present method. This figure shows the stacked tires 4 on a pallet 1. In this case, the space between the lateral parts 2 of the pallet 1 is optimally utilized. The following parameters can be adjusted to produce the rick-rack stacking pattern:

- a search range for the tire placement angle $\alpha$ within which the algorithm should search for patterns;
- the resolution of the search range;
- the maximum penetration with which the tires should be stacked in one another;
- a height compensation by which each layer of tires is corrected downwards (for example, depending on the softness of the rubber mixture);
- a search range for the rhombus angle $\phi$;
- a width compensation for the pallet.

Figure 4:
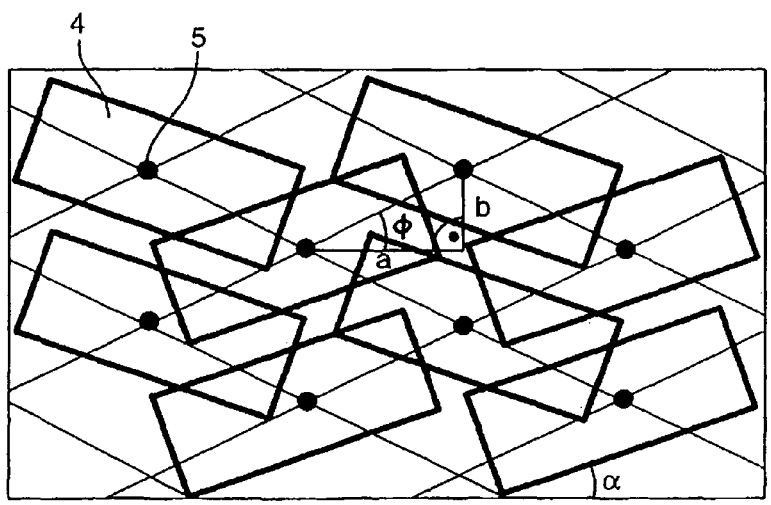
FIG. 4 shows an illustration of the angles inside the rick-rack stacking pattern.

The two specified angles, the tire placement angle $\alpha$ and the rhombus angle $\phi$, are illustrated in the schematic diagram in FIG. 4. In this case, the tire placement angle $\alpha$ is the angle between the principal plane of the tire 4 and the horizontal. The rhombus angle $\phi$ corresponds to the angle between the horizontal and the planes spanned by the midpoints 5 of the tires 4. In this case, the algorithm varies the parameters within the predefined search ranges in such a manner that the number of tires inside the pallet is maximized or the area of the rhombi visible in FIG. 4 is minimized. The result then represents a stacking pattern in which the available space is optimally utilized. The width compensation of the pallet is the dimension by which the pallet is enlarged to calculate the pattern at the sides. As a result, the intermediate spaces in the lateral parts 2 of the pallet 1 can also be used for the tires.

It is also possible to obtain the softness of the tires by means of a deformation measurement. In this case, the tire lying flat on the lateral surfaces is exposed to a defined force. The deformation thereby can be produced by a pressure plate (tire lies still) or by means of a pressure roller as it runs through. The penetration or deformation of the tire occurring in this case is measured and accordingly taken into account as a parameter in the calculation of the stacking pattern. By this means, the deviation between the calculated palleting pattern or stacking pattern and the palleting pattern which is actually established can be minimized.

Figure 2:
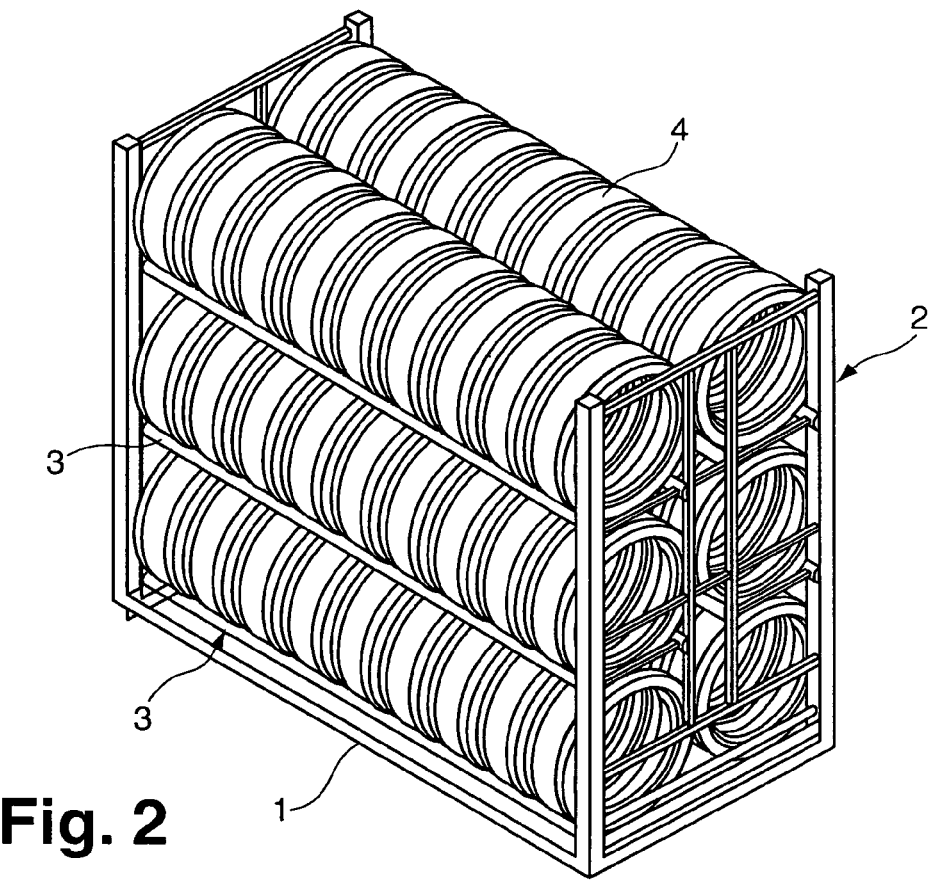
FIG. 2 shows an example of a vertical stacking pattern.

When stacking the tires in a vertical arrangement, rods 3 must additionally be inserted in the pallet 3 on which the tires are placed. This is shown in FIG. 2. In this case, each row of tires stands on a pair of such rods 3. The following parameters can therefore be predefined for producing the vertical stacking pattern:

distance of the front, lower rod from the base and the front of the pallet;
distance of the other rods relative to the front lower rod;
number of rod layers (rows of tires disposed one above the other); and
rod radius if rods having different radii are available.

Various possibilities exist for predefining these parameters. Firstly, the user can select and input all these parameters himself. A fixed pre-adjustment of some of these parameters without possible intervention by the user is also possible. It is furthermore feasible to omit the input of all or some of these parameters by predefining certain parameter sets for different tire classes or tire types and then using these to calculate the patterns. This considerably simplifies the method for the user and does not require any expert knowledge. The tire data at least required then only needs to be input manually or the CAD model measured and the corresponding pattern selected.

After all the inputs have been completed, the calculation process can be started so that the algorithm begins to search for suitable stacking patterns taking into account the predefined parameters. In this case, on the basis of the digital tire model for each combination of parameters, the algorithm calculates a stacking pattern in order to determine the stacking pattern with the largest number of tires which can be stacked by the robot without collisions. In the present example, the progress of the process, the instantaneous status and the best stacking pattern found so far are then displayed to the user. The generated patterns are stored in corresponding files and can be visualized as required, as can be seen from FIG. 3. The user can therefore directly view and assess the pattern.

If an optimum pattern was generated and verified by the user, the positional data of the tires are adopted from the pattern, appropriate trajectories are generated and the corresponding file is stored in a database and provided with a tire-specific ID. In this case, the files contain the position coordinates for the individual tires and the points for the robot path. The generation of the patterns therefore proceeds offline in the data processing unit 17.

In order to now place the tires according to the required pattern in the pallets, the tires to be stacked must initially be identified by the transfer unit 18. The type of tire can be recognized by means of suitable devices, for example, a barcode reader. The database is then searched for the identified type of tire. If the tire is not yet stored in the database, a message is output. Otherwise, the corresponding data are output by the transfer unit 18 to the robot controller. The robot can now select the respective gripper and begin the palleting (cf. FIG. 3).

Figure 5:
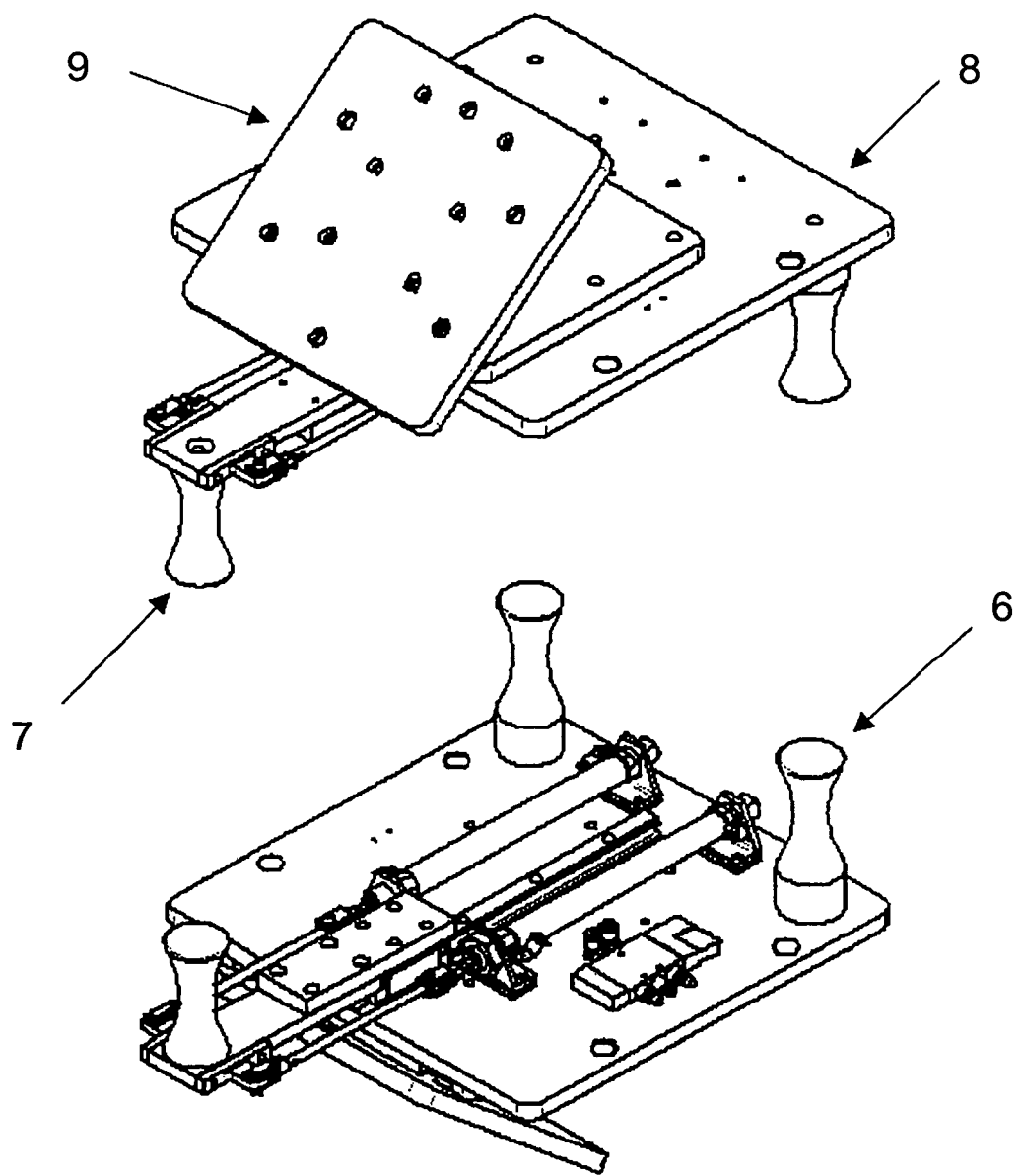
FIG. 5 shows an example of a gripping tool for the rick-rack stacking pattern.

FIG. 5 shows an example of a possible configuration of a gripping tool, hereinafter also called gripper, for producing a rick-rack stacking pattern. The tires are griped on the inner radius with this gripping tool. For this purpose the gripping tool has two fixed retaining elements 6 as well as a movable retaining element 7 which is, for example, pneumatically driven. The retaining elements 6, 7 are concavely formed so that the tires can be gripped securely. The robot flange plate 9 is fixed at an angle to the gripper base plate 8 in order to substantially compensate for the sloping position of the tires caused by the rick-rack pattern and to keep the hand axis of the robot in a vertical orientation as far as possible. Thus, collisions of the robot with tires which have already been placed on the pallet are hereby largely avoided.

Gripping of the tires takes place by the robot positioning the gripper so that the fixed retaining elements 6 touch the inner radius of the tire with the narrowest point of their concave formation. The tire is then clamped with the movable retaining element 7 and thus held. In order to avoid the tire remaining suspended with the bead on the retaining elements 6, 7 after placing the tires in the pallet, said retaining elements can be designed as foldable. The retaining elements thereby pivot away inwards. This gripper can be formed to that the two stacks of tires located on a pallet can be produced at the same time.

As a result of the gripper design, the position of the tire midpoint relative to the gripper varies depending on the inner radius and the rim width. However, the stacking positions of the tires generated by the algorithm are related to a point on the tire, for example the midpoint of the tire. Since robot can only move the same and therefore the tire by reference to a predefined point on the gripper, back calculations must be made from this point by means of a mathematical transformation to the actual tire point (e.g. tire midpoint). This is a requirement for the correct placement of the tires. The inner radius and the rim width of the tire are used as parameters here. This program runs in the background of the program for generating the pattern and need not be carried out by the user.

Figure 6:
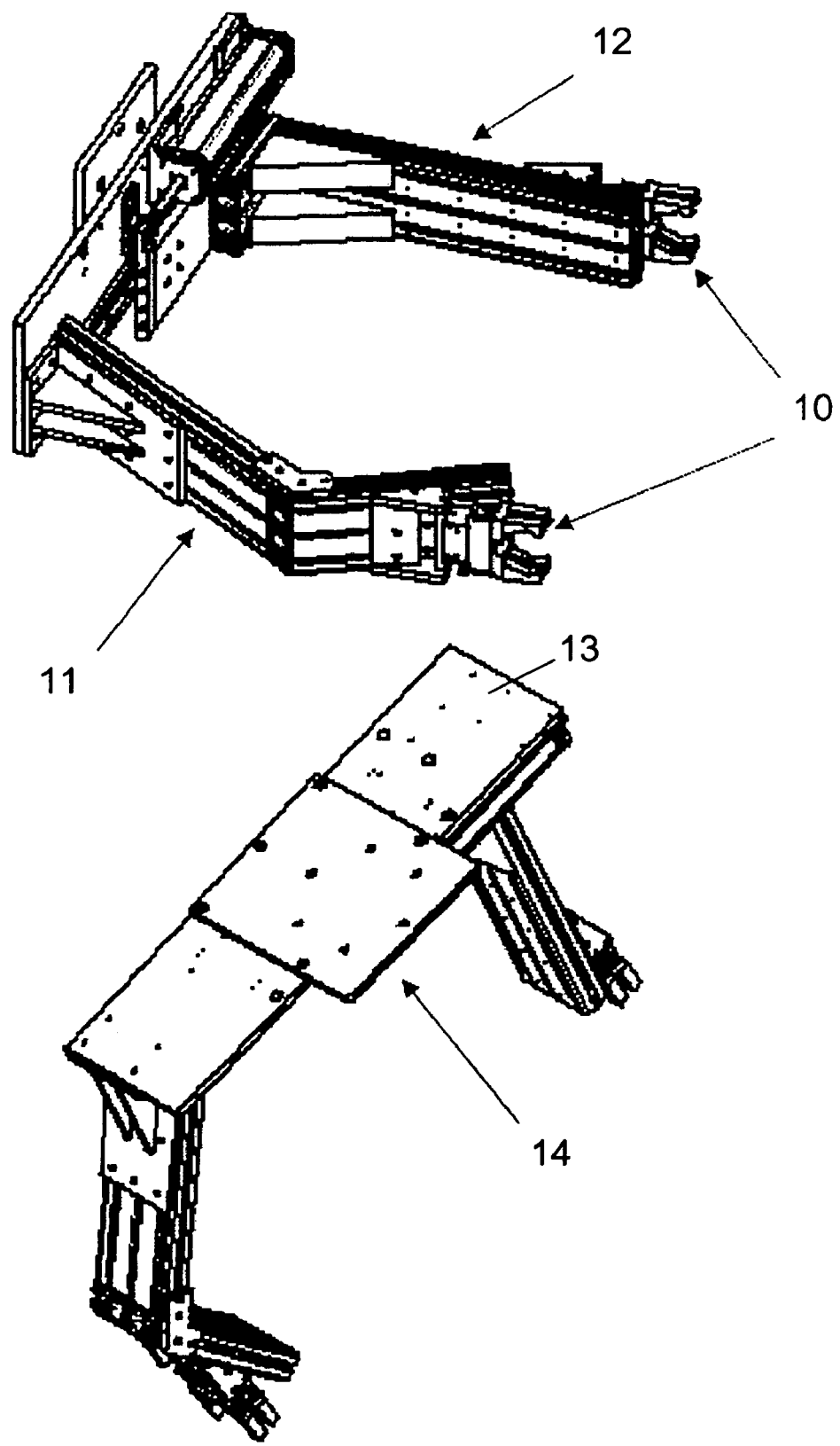
FIG. 6 shows an example of a gripping tool for the vertical stacking pattern.

FIG. 6 shows an example of a gripper for generating the vertical stacking pattern. For stacking the tires according to the vertical stacking pattern, rods must be inserted in the pallet on which the tires are placed (cf. FIG. 2). In order to avoid a change of gripper in this case, in the present example the gripper for the rods is integrated in the gripping tool for the tires.

In this case, the gripping tool consists of a fixed gripping jaw 11 which is formed at an angle, and a linearly movable gripping jaw 12 for non-positively holding the tire. Both gripping jaws are fixed to the base plate 13. The angular structure of the fixed gripping jaw 11 centers the tire and additionally guarantees a certain positive engagement. In order that the tires can be placed at the edge zones of the pallet free from collisions, the flanged plate 14 is placed off-center to the base plate 13. By turning the gripper, the hand axis of the robot can thus be positioned so that this is always located inside the pallet and does not collide with the lateral parts of the pallet. The gripping tool can thus be formed so that a plurality of tires can be gripped and placed simultaneously.

The calculated tire coordinates (positional data) relate to a certain position of the pallet. In order to keep inaccuracies in the placement of the tires as small as possible, the pallets must each be aligned. This can be accomplished by a passive alignment by means of mechanical stops and/or centering mandrels or by active centering using external units which, for example, can be driven electrically, pneumatically or hydraulically.

Figure 7:
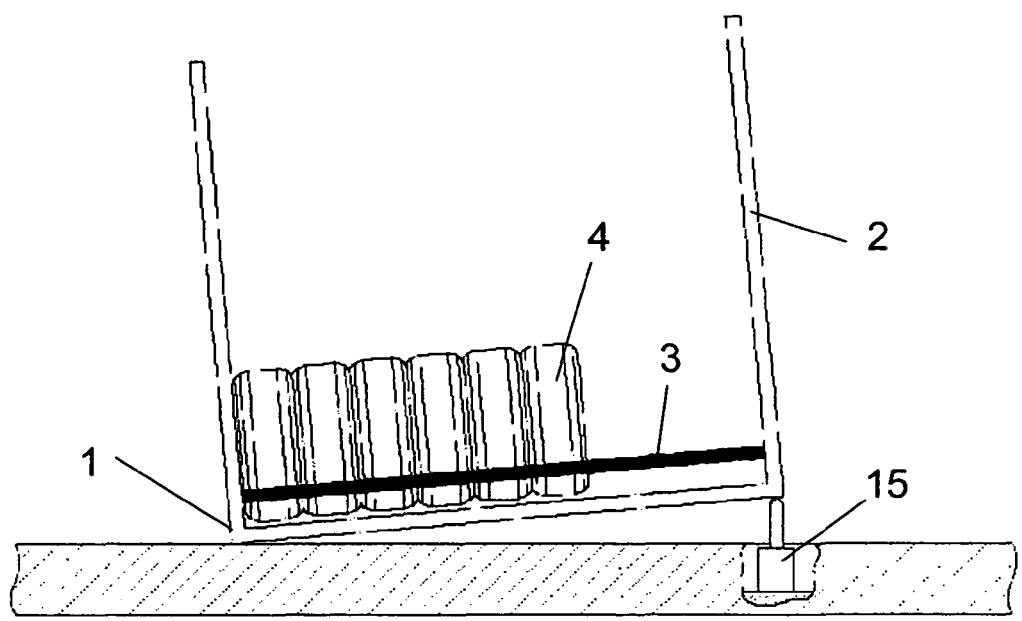
FIG. 7 shows an example for the pallet inclination.

Particularly in the case of the vertical stacking of tires, it is necessary to slope the pallet as shown in FIG. 7. The risk of tilting the tires is thus avoided since a desired direction is predefined by the slope. The drive of the tilting device 15 shown can be electrical, pneumatic or hydraulic.

Furthermore, the lateral parts 2 of the pallet 1 should be oriented as parallel as possible, ideally perpendicular to the pallet base for laying the rods required for the vertical stacking. As a result of the design, positional tolerances of several degrees can occur here which is not acceptable for an automated insertion of the rods. Thus, a device can be provided for aligning the side walls which can again be driven electrically, pneumatically or hydraulically.

Figure 8:
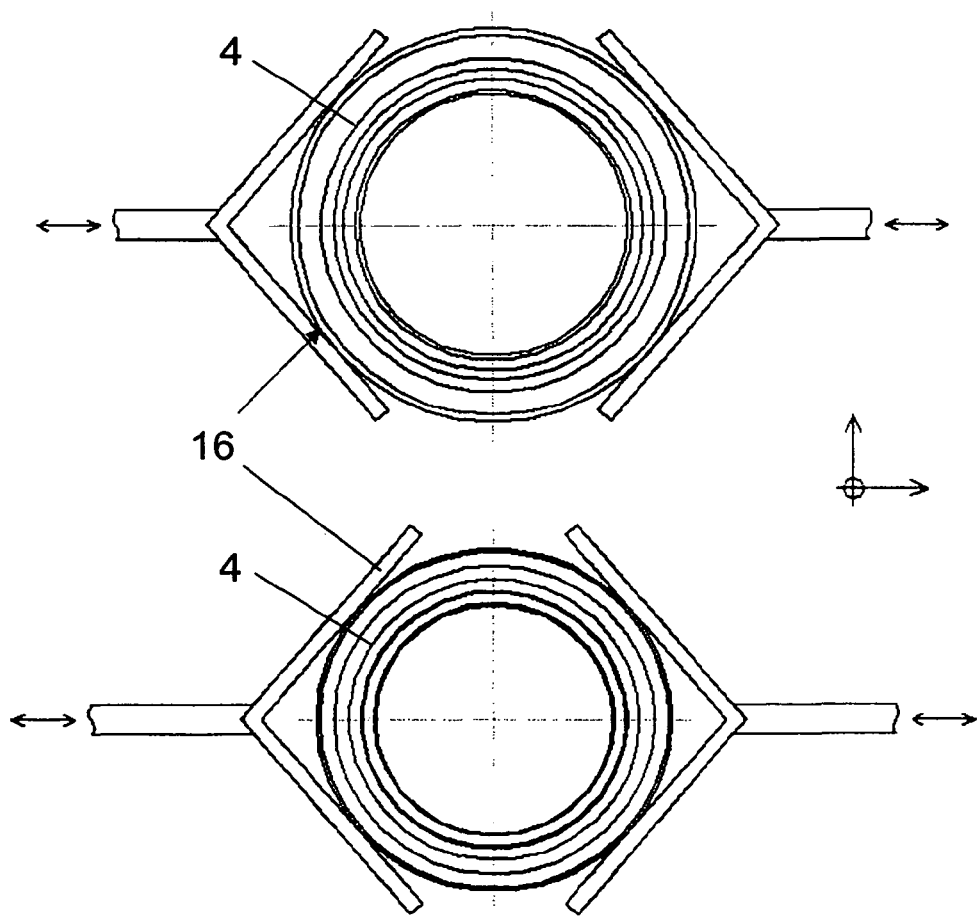
FIG. 8 shows an example of a tire centering.

The tires must be brought into a defined position so that they can be received by the robot with the aid of the appropriate gripper. This takes place with the aid of a centering device as shown, for example, in FIG. 8. This centering device is formed so that the tire midpoints are congruent in the x-y plane as a result of the centering. This can be accomplished passively by means of adjustable stops or actively by the centering mechanism shown which can be driven electrically, pneumatically or hydraulically. The contact faces of the centering jaws 16 of the centering device are fitted with rollers so that friction between tires and centering jaws is minimized. The upper partial diagram in FIG. 8 shows the centering of a large tire and the lower partial diagram shows the centering of a small tire 4.

REFERENCE LIST

1 Pallet
2 Lateral parts of pallet
3 Rods
4 Tires
5 Midpoints of the tires
6 Fixed retaining elements
7 Movable retaining element
8 Base plate
9 Robot flanged plate
10 Gripper for rods
11 Fixed gripping jaw
12 Movable gripping jaw
13 Base plate
14 Robot flanged plate
15 Tilting device
16 Centering jaws
17 Data processing unit
18 Transfer unit

The invention claimed is:

1. A method for automatically stacking tires (4) on a support (1), the method comprising:
obtaining a digital tire model of the tires (4),
extracting geometrical data of the tires (4) from the digital tire model, the geometrical data comprising at least one of tire width, outside diameter, inside diameter, or rim width,
calculating a stacking pattern for the tires on the support based on the extracted geometrical data and a predefinable size of the support (1), the stacking pattern being at least one of a rick-rack pattern or a vertical pattern in which the tires stand next to one another on their treads, said stacking pattern making it possible to store a largest possible number of tires (4) in a stable manner on the support (1),
wherein, for different types of tires, different sets of parameters are predefined and used in which ranges of variation of parameters are specified when calculating the stacking pattern,
adopting positional data of the tires (4) from the stacking pattern,
generating and storing associated trajectories of a handling device for stacking the tires (4) according to the stacking pattern,
retrieving and transferring the stored positional data and the associated trajectories for stacking the tires (4) to the handling device,
receiving the tires (4) at a given receiving position, and
placing the tires on the support (1) in accordance with the positional data and associated trajectories.

2. The method according to claim 1, characterized in that firstly stacking patterns are calculated for a plurality of tires (4) of different tire types for which the positional data as well as associated trajectories are stored, wherein before the beginning of stacking, the tires (4) to be stacked are initially identified and then the positional data and trajectories pertaining to the identified tires (4) are retrieved and transferred to the handling device.

3. The method according to claim 1, characterized in that when calculating the stacking pattern and generating the trajectories, the algorithm executes a collision detection in order to provide a stacking pattern for a collision-free stacking.

4. The method according to claim 1, characterized in that the digital tire model is automatically generated on the basis of at least one outside diameter, one inside diameter and a tire width as input parameters.

5. The method according to claim 1, characterized in that a CAD model is prepared or generated as a digital tire model.

6. The method according to claim 5, characterized in that the tires (4) are initially measured in order to generate the digital tire model.

7. The method according to claim 1, characterized in that when calculating a rick-rack pattern, at least one placement angle for the tires (4) and an angle between the horizontal and planes spanned by the midpoints of the tires are varied as parameters.

8. The method according to claim 7, characterized in that when calculating the rick-rack pattern, also a maximum mutual penetration of the tires (4) is varied as a parameter.

9. The method according to claim 1, characterized in that when calculating a vertical pattern, an arrangement of rods (3) for supporting the tires (4) on the support (1) is varied.

10. The method according to claim 1, characterized in that different gripping tools are provided, one of said tools being selected by the handling device depending on the stacking pattern to be produced.

11. A method for automatically stacking tires (4) on a support (1), the method comprising:
obtaining at least one of geometrical data of the tires (4) or a digital tire model of the tires (4),
calculating a stacking pattern for the tires on the support based on the geometrical data and/or the tire model and a predefinable size of the support (1), the stacking pattern being at least one of a rick-rack pattern or a vertical pattern in which the tires stand next to one another on their treads, the stacking pattern making it possible to store a largest possible number of tires (4) in a stable manner on the support (1),
adopting positional data of the tires (4) from the stacking pattern,
generating and storing associated trajectories of a handling device for stacking the tires (4) according to the stacking pattern,
retrieving and transferring the stored positional data and the associated trajectories for stacking the tires (4) to the handling device,
receiving the tires (4) at a given receiving position, and
placing the tires on the support (1) in accordance with the positional data and associated trajectories,
wherein when the stacking pattern is a rick-rack pattern, a first gripping tool is used for gripping the tires (4) at the inner radius, said gripping tool comprising at least two fixed retaining elements (6) and a retaining element (7) which can be moved by means of a drive on a base plate (8), wherein a flanged plate (9) for coupling the handling device is attached to the base plate (8) at an angle greater than 0 degrees and smaller than 90 degrees.

12. The method according to claim 11, characterized in that the angle at which the flanged plate (9) is disposed on the base plate (8) is adjustable.

13. A method for automatically stacking tires (4) on a support (1), the method comprising:

obtaining at least one of geometrical data of the tires (4) or a digital tire model of the tires (4), calculating a stacking pattern for the tires on the support based on the geometrical data and/or the tire model and a predefinable size of the support (1), the stacking pattern being at least one of a rick-rack pattern or a vertical pattern in which the tires stand next to one another on their treads, the stacking pattern making it possible to store a largest possible number of tires (4) in a stable manner on the support (1), adopting positional data of the tires (4) from the stacking pattern, generating and storing associated trajectories of a handling device for stacking the tires (4) according to the stacking pattern, retrieving and transferring the stored positional data and the associated trajectories for stacking the tires (4) to the handling device, receiving the tires (4) at a given receiving position, and placing the tires on the support (1) in accordance with the positional data and associated trajectories, wherein when the stacking pattern is a vertical pattern, a second gripping tool is used for gripping the tires (4) at the outer radius which additionally comprises grippers (10) for handling the rods (3).

14. The method according to claim 13, characterized in that the second gripping tool comprises a fixed angled gripping jaw (11) for centering the tire (4) and a moveable gripping jaw (12) which can be displaced linearly by means of a drive on a base plate (13), with which the tires (4) can be held non-positively.

15. The method according to claim 14, characterized in that a flanged plate (14) is attached off-center to the base plate (13) for coupling the handling device.

16. The method according to claim 1, characterized in that the support (1) is inclined for producing a vertical pattern to prevent any tipping of the tires (4) on the support (4).

17. The method according to claim 1, characterized in that the positional data and appropriate trajectories used in each case for stacking the tires (4) on the support (1) are used again at a later time point to automatically unload the support (1).

18. A device for automatically stacking tires (4) on a support (1), comprising:

a handling device and one or a plurality of gripping tools adapted for coupling to the handling device for receiving and setting down the tires (4), a data processing unit (17) comprising a calculation module that extracts geometrical data of the tires (4) from a digital tire model, the geometrical data comprising at least one of tire width, outside diameter, inside diameter, or rim width, and that, on the basis of the geometrical data of the tire (4) and a predefined size of the support (1), calculates a rick-rack pattern and/or a vertical pattern in which the tires stand next to one another on their treads as a stacking pattern for the tires (4) that makes it possible to store a largest possible number of tires (4) on the support (1) in a stable manner and that adopts positional data of the tires (4) from the stacking pattern as well as generates associated trajectories of the handling device for the stacking of the tires (4) according to the stacking pattern and stores them as control data, wherein the data processing unit uses different sets of predefined parameters for calculating the stacking pattern for different types of tires, and a transfer unit (18) which retrieves the control data for stacking the tires (4) and transfers it to a control of the handling device, which triggers the handling device according to the positional data and associated trajectories for receiving the tires (4) at a predefined receiving position and putting the tires (4) on the support (1).

19. The device according to claim 18, characterized in that the data processing unit (17) comprises a user interface via which a user can input parameters for calculating the stacking pattern.

20. The device according to claim 19, characterized in that the data processing unit (17) is connected to a display device on which the calculated stacking pattern is visualized to a user, wherein the calculation model is configured such that it stores the control data merely in response to a confirmatory input of the user at the user interface.

21. The device according to claim 18, characterized in that the transfer unit (18) is configured in such a manner that it transfers data to the controller of the handling device depending on the stacking pattern to be generated, by which means the handling device is triggered to receive a gripping tool matched to this stacking pattern.

22. A device for automatically stacking tires (4) on a support (1), comprising:

a handling device and one or a plurality of gripping tools adapted for coupling to the handling device for receiving and setting down the tires (4), a data processing unit (17) comprising a calculation module that, on the basis of geometrical data of the tire (4) and/or a digital tire model of the tire (4) and a predefined size of the support (1), calculates a rick-rack pattern and/or a vertical pattern in which the tires stand next to one another on their treads as a stacking pattern for the tires (4) that makes it possible to store a largest possible number of tires (4) on the support (1) in a stable manner and that adopts positional data of the tires (4) from the stacking pattern as well as generates associated trajectories of the handling device for the stacking of the tires (4) according to the stacking pattern and stores them as control data, and a transfer unit (18) which retrieves the control data for stacking the tires (4) and transfers it to a control of the handling device, which triggers the handling device according to the positional data and associated trajectories for receiving the tires (4) at a predefined receiving position and putting the tires (4) on the support (1), wherein at least a first of the gripping tools is configured for gripping the tires (4) at the inner radius, wherein the first gripping tool comprises at least two fixed retaining elements (6) and a movable retaining element (7) which can be displaced by means of a drive on a base plate (8), wherein a flanged plate (9) for coupling the handling device is attached to the base plate (8) at an angle greater than 0 degrees and smaller than 90 degrees.

23. The device according to claim 22, characterized in that the angle at which the flanged plate (9) is disposed on the base plate (8) is adjustable.

24. A device for automatically stacking tires (4) on a support (1), comprising:

a handling device and one or a plurality of gripping tools adapted for coupling to the handling device for receiving and setting down the tires (4), a data processing unit (17) comprising a calculation module that, on the basis of geometrical data of the tire (4) and/or a digital tire model of the tire (4) and a predefined size of the support (1), calculates a rick-rack pattern and/or a vertical pattern in which the tires stand next to one another on their treads as a stacking pattern for the tires (4) that makes it possible to store a largest possible number of tires (4) on the support (1) in a stable manner and that adopts positional data of the tires (4) from the stacking pattern as well as generates associated trajectories of the handling device for the stacking of the tires (4) according to the stacking pattern and stores them as control data, and a transfer unit (18) which retrieves the control data for stacking the tires (4) and transfers it to a control of the handling device, which triggers the handling device according to the positional data and associated trajectories for receiving the tires (4) at a predefined receiving position and putting the tires (4) on the support (1), wherein a second of the gripping tools is configured for gripping the tires (4) on the outer radius and additionally comprises grippers (10) for receiving rods (3).

25. The device according to claim 24, characterized in that the second gripping tool comprises a fixed angled gripping jaw (11) for centering the tire (4) and a movable gripping jaw (12) which can be displaced linearly by means of a drive on a base plate (13) with which the tires (4) can be received non-positively.

26. The device according to claim 25, characterized in that a flanged plate (14) for coupling the handling device is off-center on the base plate (13).

27. The device according to claim 18, characterized in that a tilting device (15) is provided for the support (1) with which the support (1) can be inclined when producing a vertical stacking pattern to prevent tipping of the tires (4) on the support (1).

28. A gripping tool for gripping tires at an inner radius of the tires and which can be used for automated stacking of the tires the gripping tool comprising:

a base plate;

a flanged plate for coupling the gripping tool to a handling device, the flanged plate attached to the base plate at an angle greater than 0 degrees and smaller than 90 degrees;

at least two fixed retaining elements (6) on the base plate; and a movable retaining element (7) which can be displaced by means of a drive on the base plate (8).

29. The gripping tool according to claim 28, characterized in that the angle at which the flanged plate (9) is disposed on the base plate (8) is adjustable.

30. A gripping tool for gripping tires on an outer radius of the tires and which can be used for stacking tires, the gripping tool comprising:

at least one first gripper including first and second opposing jaws operable to grip tires; and at least one second gripper integrated with the first gripper, the second gripper including first and second opposing jaws operable to grip rods for insertion into a pallet upon which the tires are stacked such that the inserted rods support tires placed on the pallet.

31. The gripping tool according to claim 30, characterized in that the gripping tool comprises a fixed angled gripping jaw (11) for centering the tire (4) and a movable gripping jaw (12) which can be displaced linearly by means of a drive on a base plate (13) with which the tires (4) can be received non-positively.

32. The device according to claim 31, characterized in that a flanged plate (14) for coupling to the handling device is attached off-center on the base plate (13).

* * * * *